United States Patent [19]
Howard

[11] Patent Number: 5,560,324
[45] Date of Patent: Oct. 1, 1996

[54] OSCILLATING PISTON INTERNAL COMBUSTION ENGINE

[75] Inventor: Duke Howard, Lowood, Australia

[73] Assignee: Francis David Robert Grant, Queensland, Australia; a part interest

[21] Appl. No.: 384,098

[22] Filed: Feb. 6, 1995

[30]    Foreign Application Priority Data

Feb. 10, 1994 [AU] Australia ................................ PM3821

[51] Int. Cl.[6] .................................................. F02B 53/00
[52] U.S. Cl. ............................................................ 123/18 A
[58] Field of Search .............................. 123/18 R, 18 A; 91/266, 339

[56]         References Cited

U.S. PATENT DOCUMENTS

| | | | |
|---|---|---|---|
| 736,151 | 8/1903 | Primat | 123/18 A |
| 1,809,577 | 6/1931 | Wolff | 123/18 A |
| 2,123,279 | 7/1938 | George et al. | 123/18 A |
| 2,154,315 | 4/1939 | Moraway | 123/18 A |

FOREIGN PATENT DOCUMENTS

| | | | |
|---|---|---|---|
| 40549 | 11/1981 | European Pat. Off. | 123/18 A |
| 743166 | 1/1933 | France | 123/18 A |

*Primary Examiner*—Michael Koczo
*Attorney, Agent, or Firm*—Panitch Schwarze Jacobs & Nadel, P.C.

[57]          ABSTRACT

An internal combustion engine having a plurality of arcuate pistons mounted to ends of pivotally moveable connecting rods. Each piston oscillates within an arcuate cylinder and a combustion chamber is provided at each end of the cylinder. Crankshafts are connected to the connecting rods and the crankshafts are caused to rotate when combustion occurs alternately in one combustion chamber and then in the other combustion chamber in each cylinder. An output shaft is associated with one of the crankshafts.

9 Claims, 5 Drawing Sheets

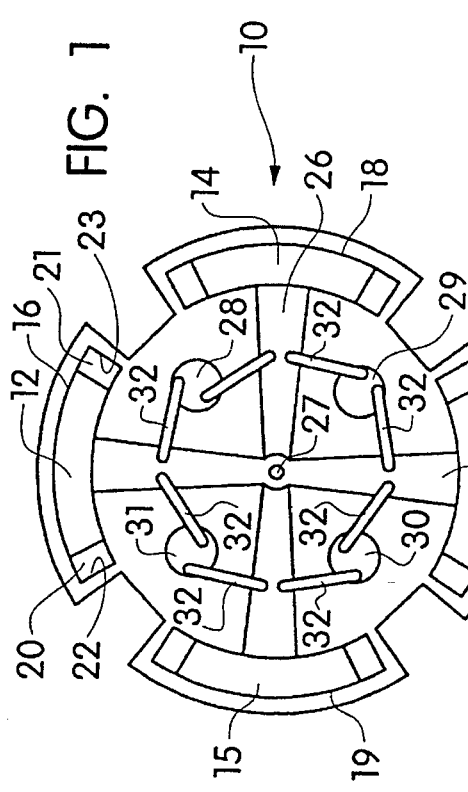
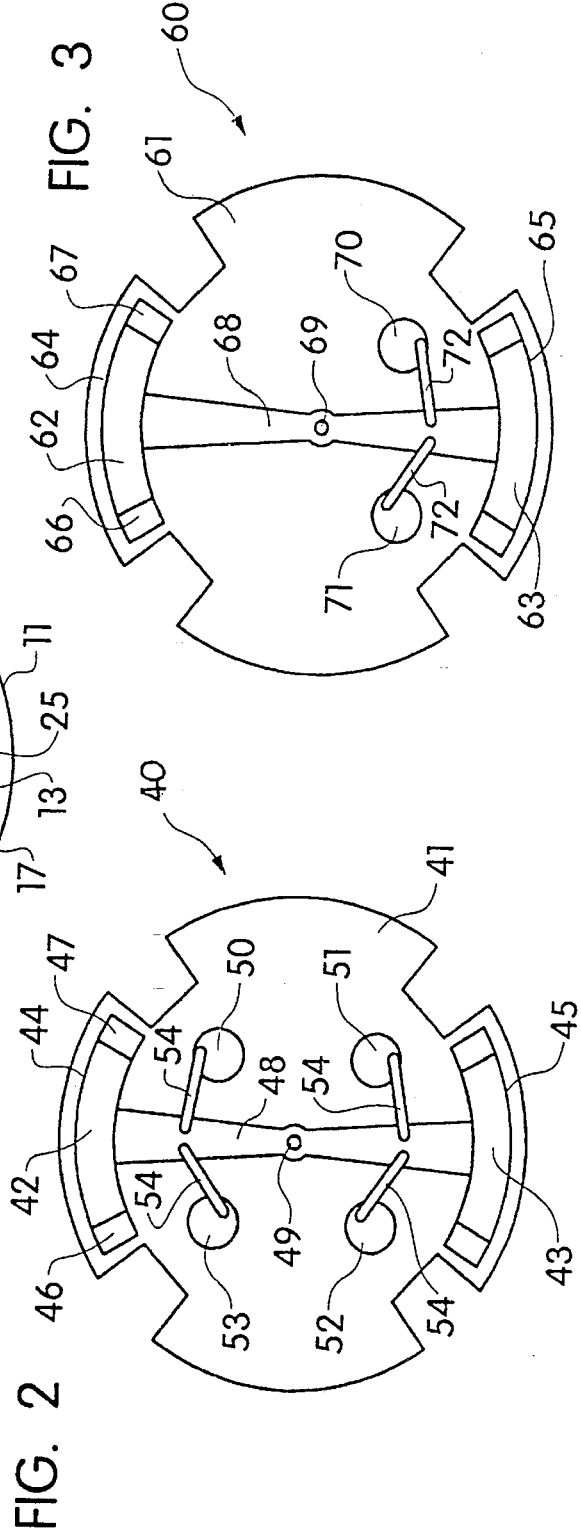

OSCILLATING PISTON INTERNAL COMBUSTION ENGINE

FIELD OF THE INVENTION

This invention relates to an internal combustion engine.

BACKGROUND OF THE INVENTION

The invention will be described by way of example with reference to engines such as two and four stroke engines operating on petrol or equivalent or substitute fuels. It should be appreciated that this is by way of example only and other engine types may also be configured or constructed to incorporate the improved construction of the present invention.

With present engines of this general type, one or more pistons are arranged to reciprocate within the cylinders in which combustion takes place. The pistons undertake reciprocal movement between a bottom dead center position and a top dead center position to cause compression of a fuel/air mixture until ignition occurs and progress through an exhaust stroke of the cycle. Ignition always occurs at one location within a combustion chamber defined by the cylinder, the engine head and one end of the piston and thus for combustion to occur the piston must always return towards top dead center. Thus, the piston moves along its reciprocating path and not all of this movement can be utilized in converting linear motion into rotary motion.

Engines have been proposed where pistons move along an arcuate rather than a linear path. U.S. Pat. Nos. 4,870,869 and 4,038,948 show engines where the piston moves along an arcuate path defined by an arcuate cylinder within a cylinder block. The driving force to be transmitted in such an engine is transmitted with higher efficiency than is the case with engines having linearly reciprocating pistons. However, the disadvantage previously referred to, namely that not all of the reciprocating motion is converted into rotary motion, still exists.

U.S. Pat. No. 3,910,239 is an attempt at minimizing this deficiency. This specification discloses an engine having a single cylinder curved about a center, intake and exhaust ports at opposite ends of the cylinder and a pair of opposed positions moveable in the cylinder towards and away from each other in compression and power strokes. The pistons cause rotation of separate crankshafts rotating in opposite directions and a more balanced engine results.

OBJECT OF THE INVENTION

It is an object of the present invention to provide an improved engine which at least minimizes the disadvantages referred to above.

SUMMARY OF THE INVENTION

According to one aspect of the invention there is provided an engine having an engine block having at least two arcuate cylinders extending therethrough with a first combustion chamber at one end and a second combustion chamber at another spaced end of each said cylinder, at least two elongate arcuate pistons each of a length shorter than the length of the cylinder and a respective said piston located within and moveable within each said cylinder, each of the pistons having a first end and a second end, at least one connecting rod having two said pistons coupled thereto, at least one crankshaft coupled to the connecting rod, an output shaft associated with one of the crankshafts and wherein ignition occurs alternately in the first and the second combustion chambers in the cylinders as the pistons move reciprocably within the arcuate cylinders.

DESCRIPTION OF PREFERRED EMBODIMENTS

The connecting rod is preferably pivotally mounted within the engine block at a location distant from its connection with the pistons. Preferably this pivotal mounting is between the ends of the connecting rod. Two crankshafts are present and are arranged on opposite sides of the connecting rod. One or more connecting arms extend between the crankshafts and the rod. The cylinders may be present at spaced locations in the block. Any desired or suitable number of cylinders may be present.

The engine may be one including ignition means such as a spark plug or any equivalent or alternative means for igniting the fuel, or may be constructed as a diesel engine where compression of the fuel causes ignition. Where a spark plug or the like is employed, the engine may operate either as a four stroke or two stroke engine.

The engine includes inlet valves for allowing fuel to enter the combustion chambers. Although any suitable valves may be used, poppet valves are preferred. Push rods may extend between the crankshafts and valves to achieve proper timing. It is preferred that these valves extend laterally of the block.

The engine includes exhaust valves and/or exhaust ports. Where the engine is a two-stroke engine, exhaust ports in the form of exhaust openings may be present in the cylinder at locations spaced a short distance from the first and second ends of the cylinder. In this way, once combustion has occurred and the piston head moves away from its associated end of the cylinder scavenging may take place once the piston uncovers the exhaust openings. Alternatively, exhaust valves such as poppet valves may be used and are located adjacent the first and the second ends of the cylinder. Push rods operable by the crankshafts may be used for controlling the exhaust valves. Exhaust ports may extend radially of the block.

The connecting rod may directly engage the crankshafts such that arcuate reciprocal movement of the piston is converted into rotational movement of the crankshafts. Alternatively, connecting arms may extend between the connecting rod and the crankshafts. Where the piston is intended to travel for a relatively long stroke within the cylinder, it may be necessary to have more than one arm provide the connection. Thus, two pivotally connected arms may extend from the connecting rod and each crankshaft although, if the engine is to have a short stroke, a respective single arm may be used to couple the connecting rod to each of the crankshafts. The length of these connecting arms may be shortened by increasing the distance between their attachment to the connecting rod and the location at which the rod is connected to the piston.

DESCRIPTION OF DRAWINGS

A particular preferred embodiment of the invention will now be described with reference to the drawings in which:

FIG. 1 is a diagrammatic elevational view of an engine according to one embodiment of the invention;

FIG. 2 is a diagrammatic elevational view of an engine according to another embodiment of the invention;

FIG. 3 is a diagrammatic elevational view of an engine according to yet another embodiment of the invention;

FIG. 1 shows a diagrammatic elevational view of an engine 10. The engine 10 has an engine block 11 and four arcuate pistons 12, 13, 14 and 15. The pistons are arranged for reciprocal movement within respective cylinders 16, 17, 18 and 19 provided in the block 11. Combustion chambers 20, 21 are present at each end of the cylinder 16. Similar combustion chambers are present in each of the other cylinders 17, 18 and 19 as shown in the figure. The combustion chambers are formed by the engine block which provides engine heads 22, 23 in cylinder 16, by the cylinder 16 and the piston 12. A similar construction is adopted for the other combustion chambers illustrated.

Figure 4:
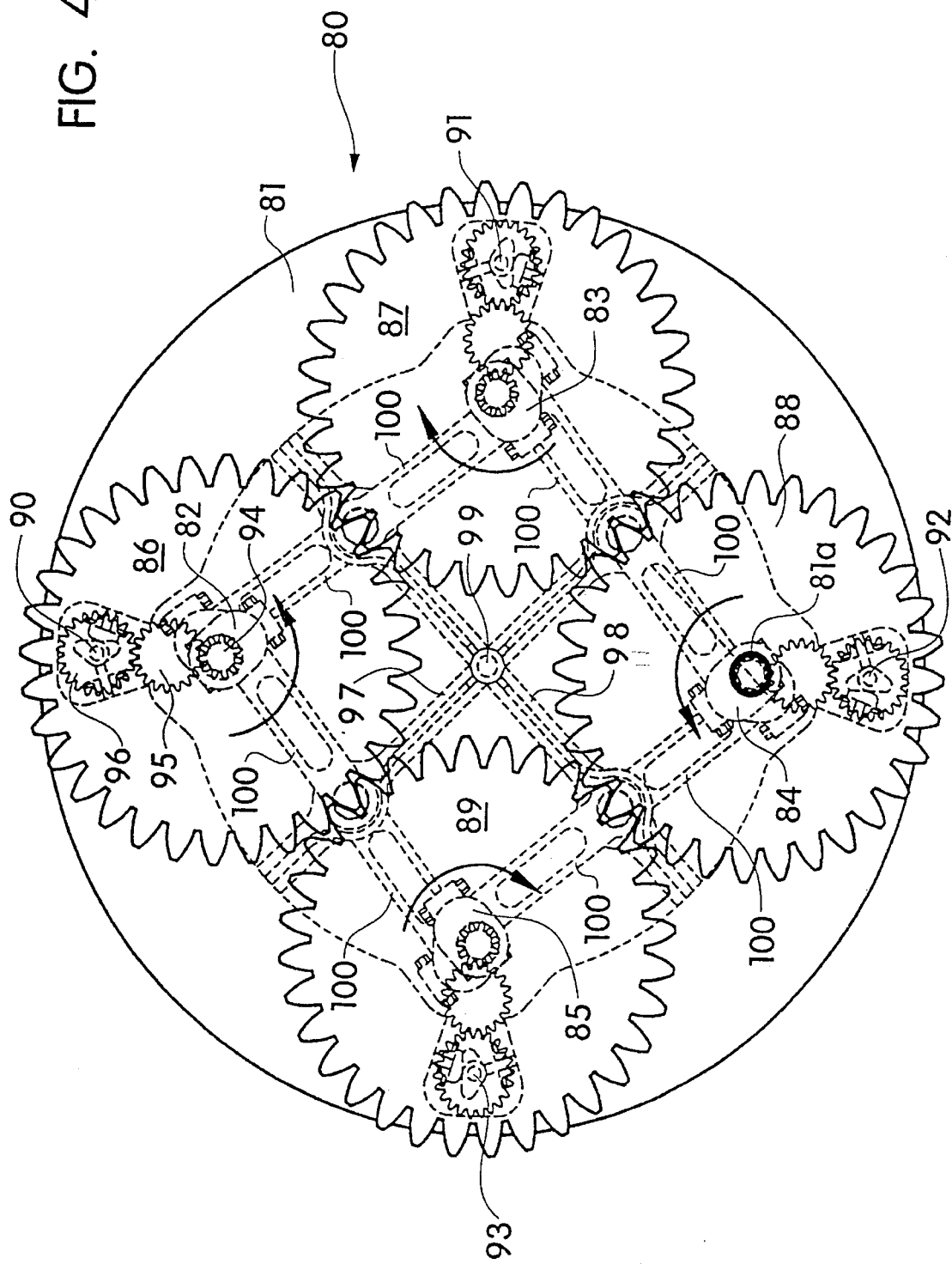
FIG. 4 is a detailed elevational view of an engine in accordance with the embodiment illustrated in FIG. 1.

Pistons 12 and 13 are connected in an opposed relationship to opposite ends of a connecting rod 25. Pistons 14 and 15 are connected in an opposed relationship to opposite ends of a connecting rod 26. The rods 25 and 26 pivot about common axis 27.

Four crankshafts 28, 29, 30, 31 are present and are coupled to the connecting rods by connecting arms 32. One of the crankshafts has an output shaft (not shown in this figure) associated with it.

The engine 10 in FIG. 1 is the equivalent of an eight cylinder engine and has four crankshafts.

FIG. 2 shows a diagrammatic elevational view of an engine 40. Engine 40 has an engine block 41 and two arcuate pistons 42, 43. Pistons 42, 43 are arranged for reciprocable movement within respective arcuate cylinders 44, 45 provided in the block 11. Combustion chambers 46, 47 are present at each end of the cylinder 44. Similar combustion chambers are present in the cylinder 45. Pistons 42 and 43 are connected in an opposed relationship to opposite ends of a connecting rod 48. Rod 48 pivots about axis 49. Four crankshafts 50, 51, 52, 53 are present and are coupled to the connecting rod 48 by connecting arms 54. One of the crankshafts has an output shaft (not shown in this figure) associated with it.

The engine 40 of FIG. 2 is the equivalent of a four cylinder engine and has four crankshafts.

FIG. 3 shows a diagrammatic elevational view of an engine 60. Engine 60 has an engine block 61 and two arcuate pistons 62, 63. Pistons 62, 63 are arranged for reciprocable movement within respective arcuate cylinders 64, 65 provided within the block 61. Combustion chambers 66, 67 are present at each end of the cylinder 64. Similar combustion chambers are present in the cylinder 65. Pistons 62 and 63 are connected in an opposed relationship to opposite ends of a connecting rod 68. Rod 68 pivots about axis 69. Two crankshafts 70, 71 are present and are coupled to rod 68 by connecting arms 72. One of the crankshafts has an output shaft (not shown) associated with it.

The engine of FIG. 3 is the equivalent of a four cylinder engine and has two crankshafts.

FIG. 4 is a detailed elevational view of the engine shown in FIG. 1. The engine 80 as viewed from the side of the engine from which the output shaft 81 extends. The engine block 81 has four crankshafts 82, 83, 84, 85 arranged within it and output shaft 81(a) forms a continuation to crankshaft 84. Of course the output shaft may extend from any of the crankshafts. The crankshafts are joined by gears 86, 87, 88, 89 which are mounted to the respective crankshafts. The gears mesh with one another and rotate in the directions indicated by the arrows shown in the figure.

Camshafts 90, 91, 92, 93 which operate inlet and exhaust valves (not shown in this figure) are rotated by a gear train consisting of gears 94, 95, 96. Gear 96 is mounted to camshaft 90, gear 95 is an intermediate gear and gear 94 is mounted on crankshaft 82. Instead of a gear train a belt or chain drive may be employed to cause crankshafts to rotate the respective camshafts.

Two connecting rods 97, 98 are shown. These pivot about axis 99 connecting arms 100 extended between the crankshafts and the connecting rods.

Figure 5:
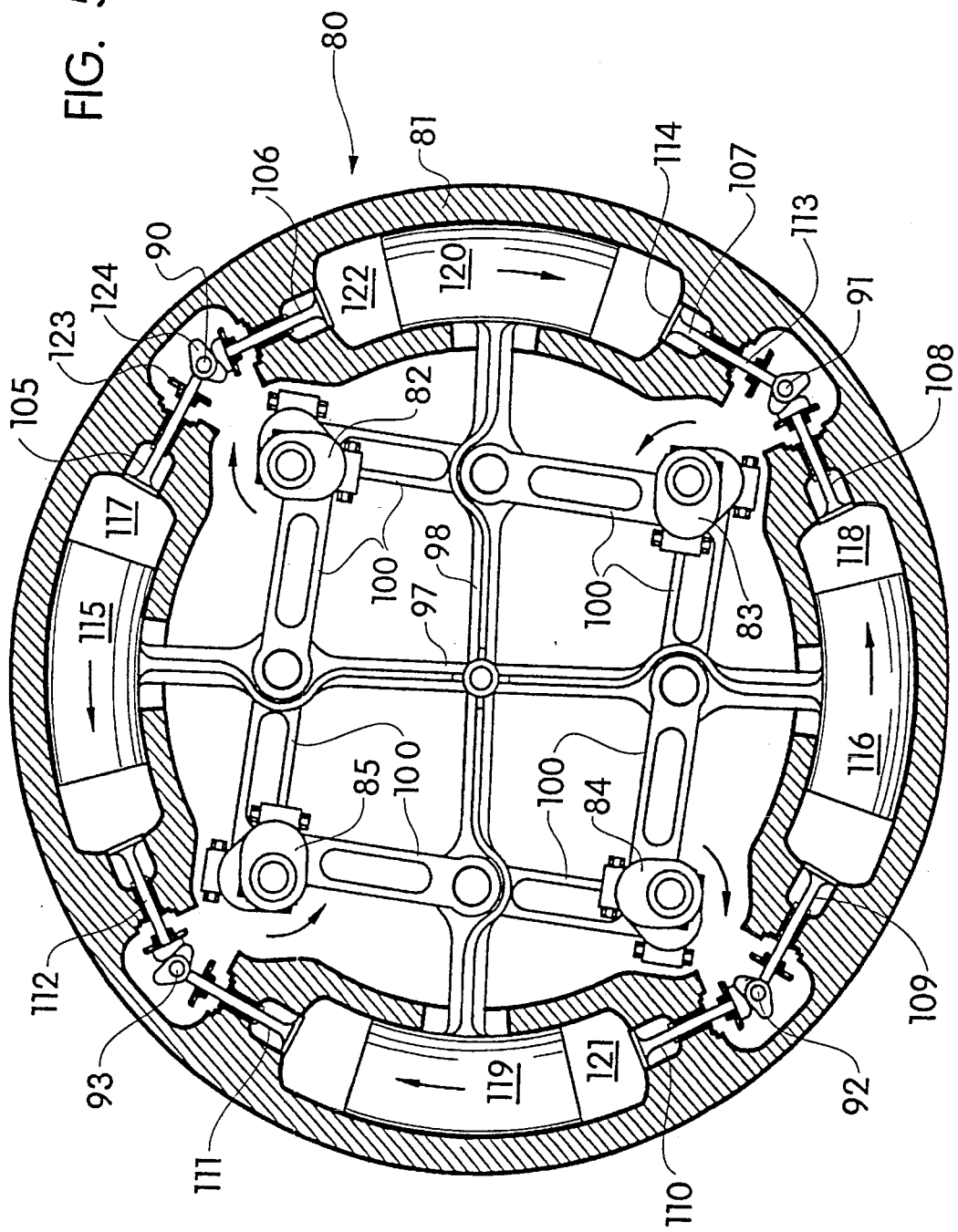
FIG. 5 is a vertical sectional view of the engine of FIG. 4.

FIG. 5 shows a sectional view of the engine 80 shown in FIG. 4. The section is taken through exhaust ports in the engine and exhaust valves 105, 106, 107, 108, 109, 110, 111, 112 are shown. Each valve has a stem 113 and a head 114. Pistons 115 and 116 are shown connected to opposite ends of connecting rod 97. Piston 115 reciprocates within cylinder 117 while piston 116 reciprocates within cylinder 118. When piston 115 moves in the direction shown by the arrow, piston 116 moves in the direction illustrated.

Pistons 119 and 120 reciprocable within cylinders 121, 122 and the pistons 119, 120 are connected to opposite ends of connecting rod 98. Connecting arms 100, extend between the connecting rods 97, 98 and the crankshafts 82, 83, 84, 85.

Each of the exhaust valves has a spring retainer 123 on its stem and the ends of the stems engage lobes 124, 125 on the camshafts.

Figure 6:
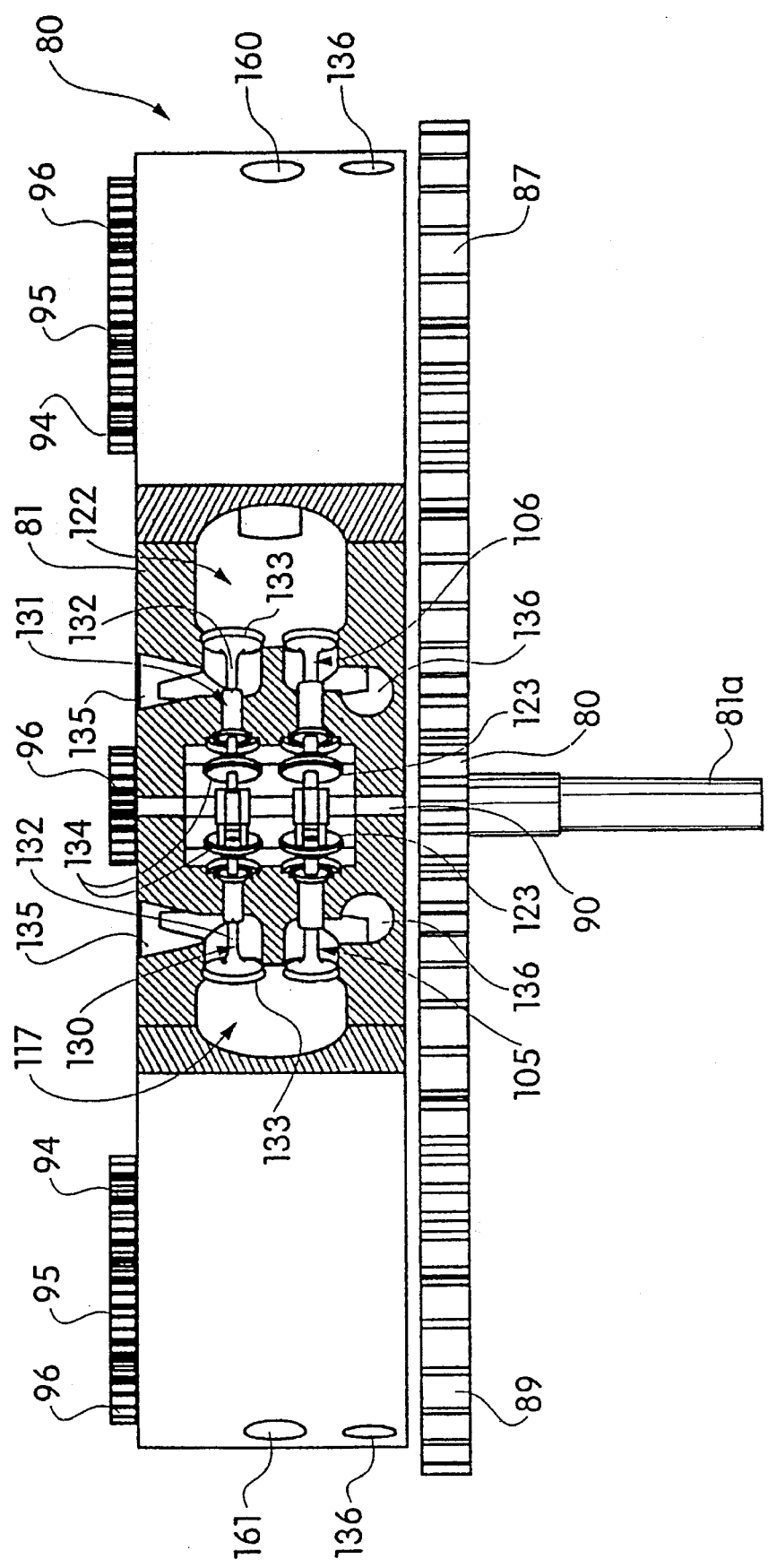
FIG. 6 is a horizontal sectional view of the engine of FIG. 4.

FIG. 6 shows inlet valves 130, 131 associated with cylinders 117, 122. Each of the valves 130, 131 has a stem 132, a head 133 and a spring retainer 134. The stems 132 engage against lobes on the camshaft 90. Inlet ports 135 communicate with the cylinders 117, 122 and extend laterally of the engine block 81. Exhaust ports 136 communicate with cylinders 117, 122 and extend radially of the block 81. A similar arrangement of valves, ports and camshafts is associated with each end of each of the cylinders of the engine.

Spark plug recess 160 extends into that end of cylinder 122 distant from the location of camshaft 90 while spark plug recess 161 extends into that end of cylinder 117 distant from the camshaft 90. The ends of cylinders 117 and 122 adjacent camshaft 90 have similar spark plug recesses not visible in this drawing. The other cylinders of the engine also have like plug recesses adjacent the ends, where the combustion chambers are located.

Figure 7:
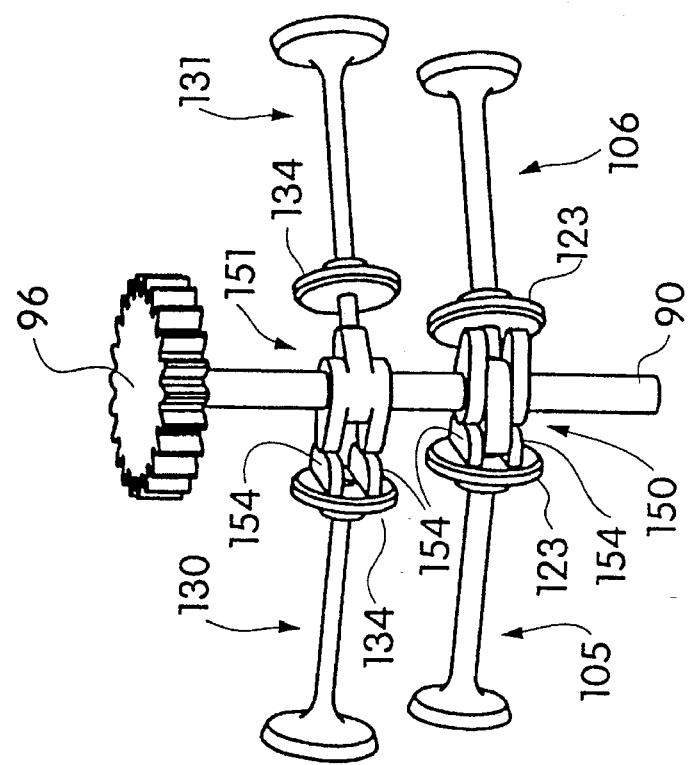
FIG. 7 is a perspective view of exhaust and inlet valves employed in the engine of FIG. 4 with the valves shown in the position assumed when they are closed.

FIG. 7 shows greater details of the camshaft 90 and the valves associated with it. The shaft 90 has two sets of lobe groups. Group 150 consists of two outer lobes 152 which have nose portions radially displaced from the nose portion of inner lobe 153. Lobe 153 contacts the end of the stem of exhaust valve 106. The valve retainer 123 mounted on the stem of exhaust valve 105 has two spaced cam followers 154 which connect lobes 152. Lobe group 151 is constructed in a similar fashion to group 150 except that it is radially displaced relative to group 150.

Inlet valve 130 and its spring retainer are constructed in a like fashion to exhaust valve 105 and its retainer while inlet valve 131 is constructed in a like fashion to exhaust valve 106. The configuration illustrated in FIG. 7 shows the position assumed by the various components when the valves are closed.

Figure 8:
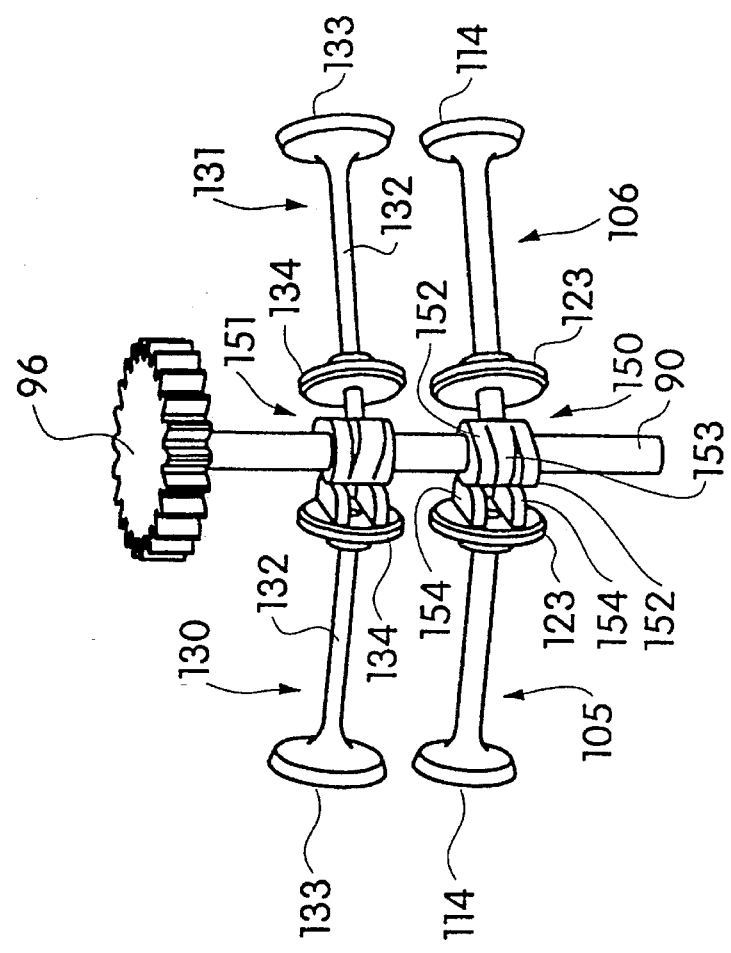
FIG. 8 is a perspective view of exhaust and inlet valves employed in the engine of FIG. 4 with the inlet valves shown in the open position.

FIG. 8 shows the configuration assumed by the valves 105, 106, 130 and 131 and the other components when the inlet valves 130, 131 are open.

I claim:

1. An internal combustion engine having an engine block with four arcuate cylinders extending therethrough with a combustion chamber at one end and a second combustion chamber at another end of each of the cylinders, four arcuate pistons of a length shorter than the length of each of the cylinders and a respective piston located within and moveable within each cylinder, each of the pistons having a first and a second end, two connecting rods with each rod having two pistons coupled thereto, four crankshafts coupled to the connecting rods by connecting arms pivotally connected to and extending between the crankshafts and the connecting rods, an output shaft associated with one of the crankshafts and a respective gear secured to one end of each of the crankshafts with the gears meshing with one another and being located on one side of the engine, and wherein ignition occurs alternatively in the first and the second combustion chambers in the cylinders as the pistons move reciprocally within the arcuate cylinders.

2. The engine of claim 1 including an inlet passage and an exhaust passage and an exhaust port communicating with each combustion chamber.

3. The engine of claim 2 wherein the inlet ports extend laterally through the block and through a side of the engine opposite to the one side thereof.

4. The engine of claim 2 wherein the exhaust ports extend radially through the block.

5. The engine of claim 2 including a respective inlet valve associated with each inlet passage and a respective exhaust valve associated with each exhaust passage.

6. The engine of claim 5 including valve timing means associated with each crankshaft and driven by the crankshaft for controlling the valves associated with two adjacent combustion chambers.

7. The engine of claim 6 wherein the valves are poppet valves each having a valve head and a valve stem, and the valve timing means each includes a camshaft with respective cams engageable by the valves and a drive coupled between the camshaft and one of the crankshafts for causing rotation of the camshaft.

8. The engine of claim 7 wherein the drive comprises a gear train extending between each crankshaft and an associated camshaft with the gear trains being located on a side of the engine opposite to the one side thereof.

9. The engine of claim 1 including a spark plug recess associated with each combustion chamber for receiving a spark plug.

* * * * *